March 16, 1937.  E. R. ARMSTRONG  2,074,247
GLARE INTERCEPTOR
Filed Nov. 22, 1935  2 Sheets-Sheet 1
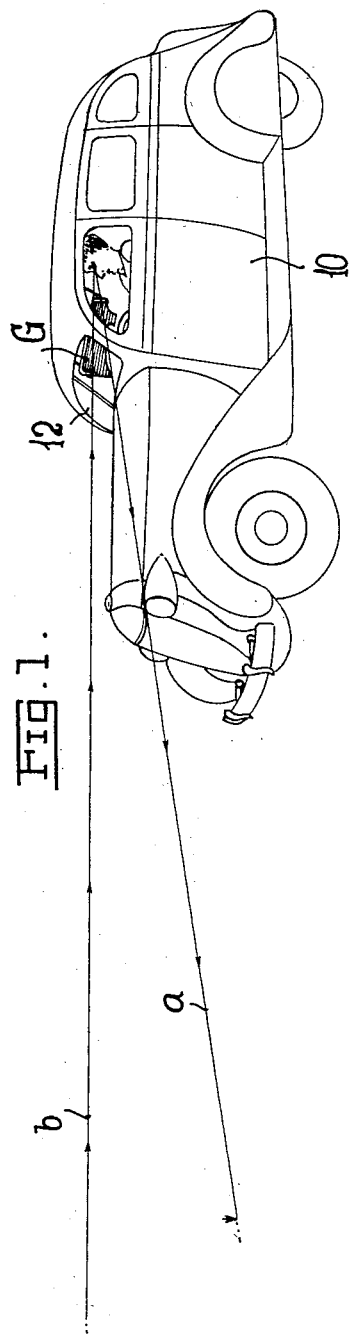
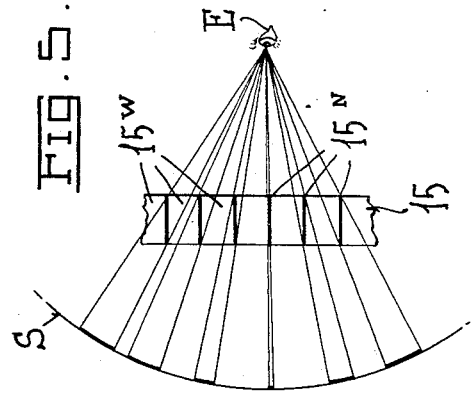
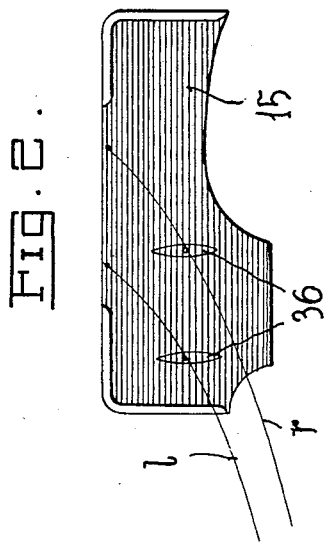
Inventor
Edward R. Armstrong
Wm. L. Edmonds
By
Attorney

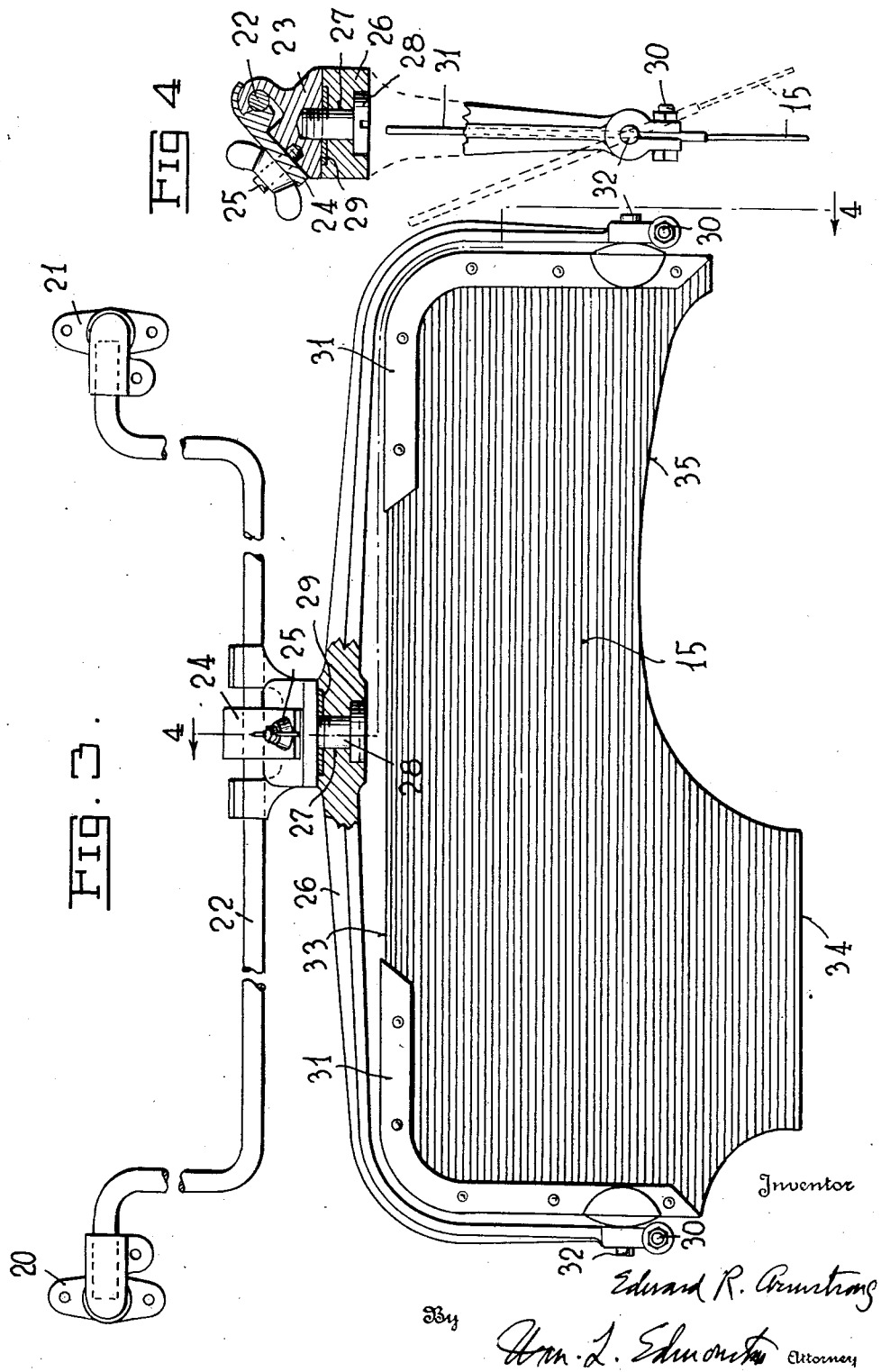

Patented Mar. 16, 1937

2,074,247

UNITED STATES PATENT OFFICE 2,074,247

GLARE INTERCEPTOR

Edward R. Armstrong, Atlantic City, N. J.

Application November 22, 1935, Serial No. 51,169

3 Claims. (Cl. 296—97)

This invention relates to improvements in glare intercepting devices, and is particularly useful for employment in an automotive vehicle.

Many attempts have been made to provide such devices, but most of them depend wholly upon the utilization of structures which intercepted a portion of the light and operated likewise to intercept a portion of the light coming from a non-glaring point (such as the road shoulder when the device is used in an automobile) and thus created a continuous driving hazard. The brilliancy of oncoming headlights at night, further, is not the only source of glare in such cases, as there is also direct sun glare in early morning and late afternoon; and the interposition of light-obstructing visors, which partly or wholly intercept the light greatly constricts the driving view and usually so limits the vision as to create a serious hazard.

The present invention is concerned with providing a glare interceptor which operates differentially over the sphere of vision, so that a maximum obstruction can be provided when the incident glare is from a dangerous direction and/or distance, while a substantially free vision is provided at the portions of this sphere of vision which contain the light rays from the road being traversed.

It will be understood that the expression "sphere of vision" is employed to designate the imaginary spherical surface from which the light rays pass in radial directions toward the eye or eyes of the person whose vision is being protected. While theoretically such a "sphere of vision" exists for each eye, because of the separation between the pupils which permits stereoscopic vision, the parallax effect is relatively small at distances beyond say thirty feet, and so long as the obstruction presented is substantially the same for the two eyes, no serious strain is produced.

The human eye reacts quickly (about $\frac{1}{16}$th of a second) by contraction of the iris when a central portion of the sphere of vision is intensely illuminated abruptly; but the re-expansion occurs much more slowly (about 4 seconds for many eyes), so that there is a "dark period" after a light flash, during which even normally illuminated adjacent portions of the sphere of vision apparently lose details. Further, the rapidly succeeding flashes, to which a vehicle rider is subjected during present-day conditions of night driving, place a severe strain upon the intensity accommodation muscles of the eyeball, headaches often result, and the driver's nerves are subjected to an exhausting strain.

Since the dangerous nature of headlight glare, for instance, increases as the distance decreases, it is necessary to provide for a variability in the light transmission for different portions of the "sphere of vision" so that practically normal visibility exists at the portions which should be observed by the vehicle driver who is using the device.

It is essential that the device must be cheap, non-cumbersome, easily positioned and adjusted, and it must present no considerable hazard in case of accident.

An illustrative form of practicing the invention is shown on the annexed drawings in which:

Fig. 1 is a diagrammatical view, substantially in upright longitudinal section, through an automotive vehicle having the device positioned before the occupant's eyes.

Fig. 2 is a diagram on a larger scale indicating the appearance of objects in the general spherical field of vision of such an occupant.

Fig. 3 is an elevation of the illustrative glare screen including the support.

Fig. 4 is a view of the same partly in section on line 4—4 of Fig. 3.

Fig. 5 is a section on a greatly enlarged scale, of a portion of the illustrative sheet material employed in the glare screen.

In Fig. 1, the vehicle 10 has a windshield 12, and a glare screen (indicated generally at G) is interposed between the occupant's eyes and the road. This screen is normally disposed at such an angle that the line of vision $a$ for the road shoulder, that is, the point watched during driving is nearly normal to the surface of the screen. The beams of light $b$ from the distant headlights of an approaching vehicle, however, encounter the screen at an angle to the normal and at a different portion of the glare screen (usually near the top thereof) on their way to the occupant's eyes and thus are at least partly obstructed as will be set out hereinafter.

In Fig. 2, the illustrated sheet 15 is conventionally represented with portions of its opposite edges parallel, although it will be understood that the position of this sheet in this "sphere of vision" causes it to obstruct a portion of this spherical field such that optically the bounding lines are really curved although conventionally shown as straight. The apparent travel of an approaching headlight, across the sheet, is downward and toward the left as shown by the lines $l$ and $r$ for the left and right eyes respectively, from the first perception of the headlight on a long straight road until the vehicle passes. The selective or differential obscuring properties of the sheet 15 cause the headlight glare to be largely obscured so long as the rays b come from a considerable distance (such as several hundred feet or more), at which these rays enter from the "sphere of vision" at points near the points through which "useful" rays enter from the portions of the highway which should be watched by the driver. As the vehicle approaches, the rays enter at points more remote from those of the "useful" rays a, and do not encounter the portions of the retina which are highly sensitive to light intensity. Finally, just prior to the moment when the headlight rays are obscured by opaque vehicle parts,—and while the rays are at maximum glare intensity, for example,—they are again subjected to a partial interception at a lower portion of the sheet 15 when this occupies an appropriate portion of the "sphere of vision".

An illustrative form of the invention is shown in Figs. 2 to 5. Supports 20, 21 are secured to fixed structures such as the body of the vehicle in the form shown, and include clamping means for preventing rotative movement of a bar 22 which is pivoted therein at its ends and has a central offset portion. This central portion receives the body 23 of a universal pivot which has a clamping piece 24 and threaded means 25 for holding the body at a desired position along the length of the bar and at a desired angle relative to the axis of the offset portion of the bar.

A stiff yoke member 26 has its split and apertured ends spaced apart to receive an obstructing member, and has an aperture 27 for a pivot and clamping screw 28. A spring washer 29 is preferably inserted between the body 23 and the member 26 to prevent accidental shifting during vibration. Clamping bolts 30 press the split ends of the member together.

The illustrated obstructing member comprises the sheet 15 of non-uniformly transparent material. The presently preferred material is a non-inflammable flexible cellulose compound, particularly cellulose acetate, which is prepared by forming thick films of light transparent composition and thin films of light-obstructing composition: it is preferred to have the light-obstructing films made opaque and black. These films are then placed alternately on top of one another to form a pile and welded together to form an integral coherent mass in which the film surfaces are substantially parallel. This mass is then shaved, preferably substantially at right angles to the surfaces of the individual films, to form sheets 15: it is obvious that each welded block will produce a great number of the sheets and hence cheapness is attainable in the manufacture. The sheets are flexible and free from shattering during accidents, and hence of themselves constitute no severe hazard, nor are they combustible if contacted by flame.

The presently preferred range of sizes (determined upon normal bases of the sizes of the eye pupil during the day and night, distances from the eye, and mechanical desirabilities) is to have the transparent films 20 to 80 thousandths of an inch thick and the light-obstructing portions 5 to 15 thousandths of an inch, which dimensions are preserved as relative widths in the finished sheet. Further, for mechanical reasons, the sheet itself should be from 30 to 100 thousandths of an inch thick: and in order to have a proper selective ratio of obstruction for angularly incident beams, the thickness of the sheet should be greater than the width of the transparent portions when the sheets are cut at right angles from the block, as then apparent overlapping of the opaque portions occurs at less than 45 degrees. An especially preferred material is a sheet having a thickness of 80 thousandths of an inch, with the transparent portions 50 and the opaque portions 10 thousandths of an inch wide.

Hence, as shown in exaggeration in Fig. 5, the "sphere of vision" of the eye E (the sphere being indicated by the line S) contains the wide transparent portions 15w and the narrow light-obstructing portions 15n, which produce the selective effects as indicated by relative arcuate lengths of the heavy portions of the line S.

Each sheet is then preferably stiffened by providing the L-shaped metal channel edge guards 31 which extend along the vertical edges and along a part of one horizontal edge, so that the assembly may be flexed to permit it to be assembled in the yoke member 26. The guards can be fixedly secured by locally depressing the material of guards into the sheet. The guards are provided with projecting pivot pins 32, which are received in the apertures of the yoke ends and are held clamped by the bolts 30 which permit angular adjustment of the sheet assembly about the common axis provided by the pins, as to the dotted line position shown in Fig. 4.

It is preferred to have one horizontal edge 33 of the sheet substantially straight, this being the edge partly protected by the guards 31; while the other horizontal edge has a straight portion 34 which has an appropriate spacing from the common axis through the pivot pins 32 to assure presentation of the sheet 15 between the eye and an approaching headlight while the latter is very close, as aforesaid, and a curved edge portion 35 provided by cutting away the sheet from the vertical edge which is nearer the adjacent road shoulder, to afford direct vision thereto if desired during night driving when the device is presented at a relatively large angle to the vertical, in which position the sheet has a high factor of obstruction to all light rays passing to the eye. This also is an excellent position of adjustment when the device is used during daytime to obstruct road glare or the rays of the rising or setting sun.

The normal relative position of the edges 33, 34 for night driving is illustrated in Fig. 3. It is also possible to invert the sheet assembly by rocking about the common axis of pins 32 and have the edge 33 downward: in which case it is customary to shift the bar 22 in supports 20, 21 so that the edge 33 is about at the line of vision a. The absence of any portion of guards 31 at the center avoids the presence of a "blind zone" in such cases.

A peculiar characteristic of the sheet 15 is that the glare of a headlight or other light source does not appear to scatter horizontally along the strips, but only vertically as indicated by the areas 36 in Fig. 2 corresponding to a particular distance for a headlight. Thus, objects located on the "sphere of vision" at short apparent horizontal angles therefrom are clearly distinguishable, and the driver is freed from the visual difficulties which normally exist by the great lateral apparent dispersion from an intense source.

Another characteristic is that a very intense source of illumination is not wholly obscured, when the sheet is turned to such an angle that the opaque portions slightly overlap in the line of vision, due possibly to internal reflections in the transparent portions. Hence the headlights are not entirely cut off, although reduced to very low apparent intensities, and the driver can determine the position of the approaching vehicle accurately even under such conditions.

The position of the interceptor blade and its angularity in relation to approaching cars is easily adjusted, as shown in Figs. 3 and 4, to the needs of the driver, which adjustments variously affect the reflection, refraction and polarization of the light reaching the interceptor blade from the headlights of approaching motor cars, the amount of light to be finally transmitted through the interceptor being that desired within the approximate limits ranging from zero to 100%. Under zero adjustment the rays of the sun can be directly intercepted, while under 100% visibility adjustment, vision through the interceptor, for all practical purposes, is not interfered with. When the interceptor is used as a visor, vision through it may be regulated or adjusted so as to effectively shut out sun glare in the early morning or late afternoon when it is approaching the horizon, yet offer no obstruction to driving vision because of the difference in viewing angle, varying the light transmission value in some related proportion, to effectively cut off the sun's rays while but little affecting the view of relatively close objects and of the road ahead.

When used as a visor to intercept the sun's rays, the transversely sliding and universal movements of the interceptor sheet, possible by the design of the mounting, permits it to be adjusted to any view angle in front or on either side, such as that shown in dotted lines in Fig. 4, to any position where the rays of the sun would otherwise interfere with the driving. When not in use the whole device may be, with one touch of the hand, folded up against the roof of the car out of the way but yet instantly accessible for use when required.

It is obvious that the invention is not limited to this illustrative form, but that it may be employed in many ways within the scope of the appended claims.

I claim:

1. A glare screen comprising an integral flexible sheet of material having alternating transparent and light-obstructing portions each extending through the thickness of the sheet from face to face thereof and arranged horizontally in substantial parallelism with one another, each obstructing portion having a thickness of 5 to 15 thousandths of an inch, the transparent portions each having a width substantially five times as wide as each adjacent obstructing portion, and the sheet having a uniform thickness greater than the width of the adjacent transparent portions.

2. A glare screen comprising an integral sheet of flexible non-shattering material of uniform thickness and having alternating transparent and light-obstructing portions extending from face to face of the sheet and bounded by substantially parallel lines at the faces of the sheet, said transparent portions having a width parallel to a surface of the sheet between 20 and 80 thousandths of an inch and said light-obstructing portions having a corresponding width of less than 15 thousandths of an inch, the sheet having a substantially uniform thickness between 30 and 100 thousandths of an inch, the thickness being greater than the width of the transparent portions.

3. A glare screen comprising an integral flexible sheet formed of united horizontally directed layers of cellulose compound and the like, said layers alternately being composed of transparent material and light obstructing material, said transparent material, having a dimension of 20 to 80 thousandths of an inch in the direction parallel to the surface of the sheet and at right angles to the length of the layers, said light obstructing material having a like dimension of 5 to 15 thousandths of an inch with said sheet having a thickness greater than said dimension of the transparent portions.

EDWARD R. ARMSTRONG.